United States Patent
Yari et al.

(10) Patent No.: US 8,883,696 B2
(45) Date of Patent: *Nov. 11, 2014

(54) SLIDING MECHANISM AND FRICTION REDUCTION METHOD FOR THE SAME

(75) Inventors: Keisuke Yari, Ageo (JP); Sachiyo Ono, Kasukabe (JP); Masaru Iijima, Ageo (JP); Noriyoshi Tanaka, Fujimino (JP); Kenji Yamamoto, Tokyo (JP); Akihiro Kotaka, Tokyo (JP)

(73) Assignees: UD Trucks Corporation, Ageo-shi (JP); Adeka Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/993,132

(22) PCT Filed: Oct. 21, 2011

(86) PCT No.: PCT/JP2011/074270
§ 371 (c)(1),
(2), (4) Date: Jun. 11, 2013

(87) PCT Pub. No.: WO2012/081309
PCT Pub. Date: Jun. 21, 2012

(65) Prior Publication Data
US 2013/0266245 A1    Oct. 10, 2013

(30) Foreign Application Priority Data

Dec. 13, 2010 (JP) ................................. 2010-276929

(51) Int. Cl.
| | | |
|---|---|---|
| *F16C 33/20* | (2006.01) | |
| *C10M 135/18* | (2006.01) | |
| *C10M 137/10* | (2006.01) | |
| *F16C 33/10* | (2006.01) | |
| *F16C 33/12* | (2006.01) | |
| *F16C 29/02* | (2006.01) | |
| *C10M 169/04* | (2006.01) | |

(52) U.S. Cl.
CPC .......... *F16C 29/02* (2013.01); *C10M 2219/068* (2013.01); *C10N 2230/06* (2013.01); *C10M 135/18* (2013.01); *F16C 33/124* (2013.01); *C10M 2227/066* (2013.01); *F16C 33/1095* (2013.01); *C10N 2280/00* (2013.01); *C10N 2240/02* (2013.01); *C10M 2203/1006* (2013.01); *C10M 169/04* (2013.01)
USPC ........... 508/100; 508/335; 508/363; 508/369; 384/13

(58) Field of Classification Search
USPC ...................... 384/13; 508/100, 335, 363, 369
See application file for complete search history.

(56) References Cited

U.S. PATENT DOCUMENTS

| | | | |
|---|---|---|---|
| 2007/0078067 A1* | 4/2007 | Nakagawa et al. | ........... 508/363 |
| 2008/0146468 A1* | 6/2008 | Konishi et al. | ................ 508/109 |

FOREIGN PATENT DOCUMENTS

| | | |
|---|---|---|
| JP | H10-219267 | 8/1998 |
| JP | 2001-316686 A1 | 11/2001 |
| JP | 2005-98495 A1 | 4/2005 |
| JP | 2007-205564 A1 | 8/2007 |
| JP | 2009-114311 A1 | 5/2009 |

OTHER PUBLICATIONS

International Search Report for International Application No. PCT/JP2011/074270 dated Jan. 17, 2012.

* cited by examiner

*Primary Examiner* — Vishal Vasisth
(74) *Attorney, Agent, or Firm* — Kratz, Quintos & Hanson, LLP

(57) ABSTRACT

The purpose of the present invention is to provide: a sliding mechanism having a lubricating film formed on the sliding surface thereof, and capable of exhibiting friction-reducing performance; and a friction reduction method for the same. To that end, the present invention entails coating the sliding surface with chromium nitride, adding a molybdenum dithiocarbamate with molybdenum in the amount of 600-1000 ppm to diesel engine oil, setting the arithmetic mean roughness of the sliding member to 2-60 nm, and upon converting the Sommerfeld number viscosity to Pa·s, the speed to $s^{-1}$, and the load to mean Hertzian stress (Pa), then the lubrication conditions for use are within the range of $2.12365 \times 10^{-20}$ to $5.94509 \times 10^{-19}$.

2 Claims, 2 Drawing Sheets

SLIDING MECHANISM AND FRICTION REDUCTION METHOD FOR THE SAME

This application is a 371 of PCT/JP2011/074270, filed Oct. 21, 2011.

TECHNICAL FIELD

The present invention relates to a sliding mechanism comprising one sliding member (for example, a shaft) and the other sliding member (for example, bearings), and both members are lubricated by a lubricant, and friction-reducing technique in such a sliding mechanism.

BACKGROUND ART

When an iron series material such as steel is used as a sliding member, it has conventionally been known that an organic molybdenum lubricating oil additive such as molybdenum dithiocarbamate (MoDTC) which is a friction reduction agent exhibits low friction properties when it is added to a lubricant.

Here, in a lubricant (for example, engine oil) actually used in industry, various additives are contained. For example, an extreme pressure agent represented by zinc dialkyldithiophosphate (ZnDTP) or a detergent-dispersant forms a lubricating film at the sliding surfaces as in the lubricant. Therefore, the lubricating oil to which an organic molybdenum lubricating oil additive has been added cannot sufficiently form a lubricating film at the sliding surfaces.

That is, various kinds of additives other than the additives for the lubricating oil compete for forming the lubricating film, so that even when the organic molybdenum lubricating oil additive is added, there are cases where the effects cannot be obtained or the effects cannot sufficiently be exhibited.

In particular, since diesel engine oil contains a detergent-dispersant with a large amount, the phenomenon markedly generates that the effects cannot be obtained or the effects cannot sufficiently be exhibited, although the organic molybdenum lubricating oil additive is added, As the other prior art, for example, a technique in which zinc dialkyl dithio compound and a lubricant are mixed has been proposed (see Patent Literature 1).

However, an object of such a prior art is to reduce the friction coefficient in the range of a low to medium temperature, and it does not intend to solve the above-mentioned problems.

CITATION LIST

Patent Literature

Patent Literature 1: Japanese Patent Application Non-examined Publication Gazette No. H10-219267 (JPA H10-219267)

SUMMARY OF INVENTION

Problems to be Solved by the Invention

The present invention has been proposed in view of the problems of the prior art as mentioned above, and an object is to provide a sliding member in which a lubricating film is formed at the sliding surfaces whereby friction-reducing property can be exhibited.

Solution to Problem

The inventors have intensively studied, and as a result, they have found that molybdenum dithiocarbamate (MoDTC) is added even to a general diesel engine oil, and at least one of the sliding members is coated by a chromium nitride (CrN), a friction coefficient is reduced under certain conditions whereby low friction performance can be exhibited.

The present invention has been created based on such a fact.

The sliding mechanism of the present invention is characterized in that it is used under the lubricating conditions in which a Sommerfeld number (S=viscosity×speed÷load) is in the range of $2.12365 \times 10^{-20}$ to $5.94509 \times 10^{-19}$ upon converting the viscosity thereof to Pa·s, the speed to $s^{-1}$, and the load to mean Hertzian stress (Pa), at least one sliding surface of the sliding members made of a steel material is coated by a chromium nitride (CrN), diesel engine oil to which molybdenum dithiocarbamate (MoDTC) is added with molybdenum in the amount of 600 ppm to 1000 ppm is interposed between the sliding members as a lubricant, and that an arithmetic mean roughness of the sliding members is in the range of 2 to 60 nm.

A method for reducing a friction of a sliding mechanism of the present invention comprises:

a step for coating a chromium nitride (CrN) to at least one sliding surface of the sliding members made of a steel material, a step for adding molybdenum dithiocarbamate (MoDTC) with molybdenum in the amount of 600 ppm to 1000 ppm to diesel engine oil, a step for setting the arithmetic mean roughness of the sliding member(s) to 2 to 10 nm, and a step for setting the lubrication conditions in which the Sommerfeld number (S=viscosity×speed÷load) is in the range of $2.12365 \times 10^{-20}$ to $5.94509 \times 10^{-19}$ upon converting the viscosity thereof to Pa·s, the speed to $s^{-1}$, and the load to mean Hertzian stress (Pa).

Advantageous Effects of Invention

According to the present invention having the above-mentioned constitutions, friction performances are markedly lowered although it has a sliding surface coated by a chromium nitride (CrN) which increases a friction coefficient in a general diesel engine oil.

Here, by setting the lubricating conditions in the range as mentioned above, it has been confirmed that good lubricating performances can be shown in the region of a boundary friction at which a lubricating film is formed between the sliding members. That is, according to the present invention, although it is diesel engine oil containing a large amount of a detergent-dispersant, when molybdenum dithiocarbamate (MoDTC) is added thereto, the effect can be sufficiently exhibited.

DESCRIPTION OF EMBODIMENTS

In the following, an embodiment of the present invention is explained by referring to the attached drawings.

As an embodiment of the present invention, in a bearing structure, for example, one of the sliding members is a shaft, and the peripheral surface (the sliding surface) of said shaft was coated by chromium nitride (CrN) according to the arc ion plating (AIP) technique. The arithmetic mean roughness of the shaft surface was made 50 nm.

On the other hand, as the other sliding member, a bearing (at least inner race) was made from high-carbon chromium bearing steel (SUJ2).

As a lubricant, diesel engine oil of Japanese Automotive Standards Organization "DH-2", to which molybdenum dithiocarbamate (MoDTC) with molybdenum in the amount of 700 ppm had been added, was used.

Such bearing was used under the sliding conditions (mixed lubricating region) of the Sommerfeld number of $2.12365 \times 10^{-19}$.

As a result, such bearing was markedly decreased in the friction coefficient as compared with a case where the sliding both members are high-carbon chromium bearing steel (SUJ2), lubricating with diesel oil (DH-2) to which no molybdenum dithiocarbamate (MoDTC) had been added and used under the sliding conditions (mixed lubricating region) of the Sommerfeld number of $2.12365 \times 10^{-19}$.

EXPERIMENTAL EXAMPLE 1

Figure 1:
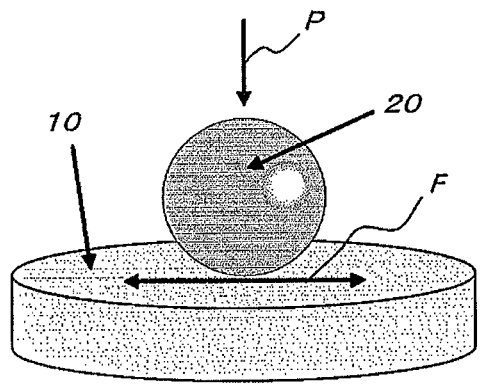
[FIG. 1] This is a conceptual drawing of a ball-on-disk type high-frequency reciprocating rig being used in Experimental Examples.

Experimental Example 1 was carried out by using a ball-on-disk type high-frequency reciprocating rig (HFRR) as shown in FIG. 1.

In FIG. 1, a ball 20 made of high-carbon chromium bearing steel (SUJ2) was placed on a plate shaped substrate 10 (arithmetical mean roughness: 50 nm), and the substrate 10 and the ball 20 were lubricated by diesel engine oil.

In FIG. 1, the arrow P is a load loaded to the ball 20, and the arrow F is a direction of acting the friction force.

With regard to the load P, it was set to 1000 g or 400 g so that the lubricating conditions in Experimental Example 2 mentioned below are aligned as equal intervals as possible.

The substrates 10 were categorized in two cases, in one of which cases the substrate is constituted by high-carbon chromium bearing steel (SUJ2), and in other one of which cases titanium nitride aluminum was coated on the ball 20 side (sliding surface side) of high-carbon chromium bearing steel (SUJ2).

With regard to the lubricant, two kinds of diesel engine oils {diesel engine oil (hereinafter referred to the reference "CD") with the American Petroleum Institute standard of "CD", and diesel engine oil (hereinafter referred to the reference "VDS-4 (DH-2)") which is "VDS-4" according to the original standard of Volvo group to which the applicant belongs, and is "DH-2" according to Japanese Automotive Standards Organization: both are general diesel engine oils} were used. Also, they were categorized in two cases, in one of which cases molybdenum dithiocarbamate (MoDTC) with molybdenum in the amount of 700 ppm had been added, and in other one of which cases no molybdenum dithiocarbamate (MoDTC) had been added.

Experiments were carried out in total of eight kinds of samples (No. 1 to No. 8 in the following Table 1) by combining the substrate and the lubricant.

The combinations of the material of the substrate 10 and the lubricant are shown in Table 1 below with regard to eight kinds of the respective samples.

TABLE 1

| Ball test piece | Disk test piece | | Lubricating oil | |
|---|---|---|---|---|
| No. | Substrate | Coating | Kind | Friction controller |
| 1 | SUJ2 | SUJ2 | — | CD | — |
| 2 | SUJ2 | SUJ2 | CrN | CD | — |
| 3 | SUJ2 | SUJ2 | — | CD | MoDTC |
| 4 | SUJ2 | SUJ2 | CrN | CD | MoDTC |
| 5 | SUJ2 | SUJ2 | — | VDS-4 (DH-2) | — |
| 6 | SUJ2 | SUJ2 | CrN | VDS-4 (DH-2) | — |
| 7 | SUJ2 | SUJ2 | — | VDS-4 (DH-2) | MoDTC |
| 8 | SUJ2 | SUJ2 | CrN | VDS-4 (DH-2) | MoDTC |

Figure 2:
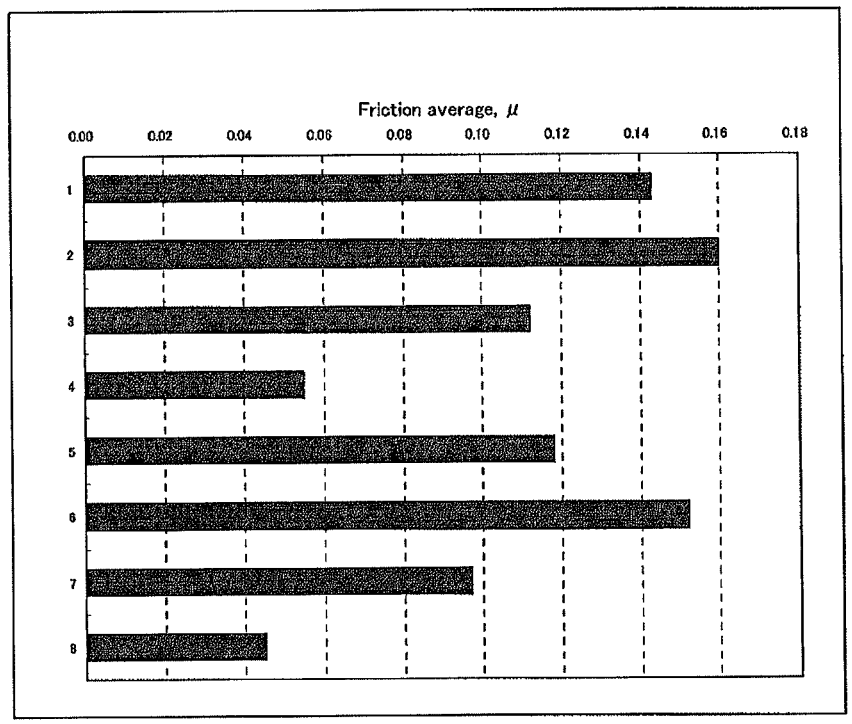
[FIG. 2] This is a figure showing friction coefficients of eight kinds of samples used in Experimental Example 1 comparing to each other.

The test results of Experimental Example 1 using the ball-on-disk type high-frequency reciprocating rig (HFRR) as shown in FIG. 1 are shown in FIG. 2.

The horizontal axis of FIG. 2 shows a friction coefficient μ and the vertical axis shows the sample No.

In FIG. 2, when Samples No. 1 and No. 2, and Sample No. 5 and Sample No. 6 are compared to each other, it can be understood that, in either of two kinds of diesel engines, if no molybdenum dithiocarbamate (MoDTC) is added, the samples (No. 2 and No. 6) in which chromium nitride has been coated to the substrate 10 are larger friction (μ is large) and inferior in the lubricating performances to the samples (No. 1 and No. 5) in which chromium nitride has not been coated to the substrate 10.

From the results, it can be understood that the lubricating performance is lowered when chromium nitride has been coated in the case (general case) where molybdenum dithiocarbamate has not been added to diesel engine.

To the contrary, the results of Sample No. 4 and No. 8 are compared with the results of other samples in FIG. 2, it can be understood that the friction becomes markedly small (μ is markedly small) and the lubricating performances are remarkably improved when molybdenum dithiocarbamate (MoDTC) has been added to the diesel engine and the substrate 10 has been coated by chromium nitride.

That is, from Experimental Example 1, it could be confirmed that the friction becomes markedly small (μ is markedly small) and the lubricating performances are remarkably improved when molybdenum dithiocarbamate (MoDTC) has been added to the diesel engine and one of the sliding members is coated by chromium nitride.

In other words, from Experimental Example 1, even when a general diesel engine oil which contains a large amount of a detergent dispersant is used as a lubricant, it can be estimated that the detergent dispersant does not inhibit the diesel engine oil to which molybdenum dithiocarbamate (MoDTC) has been added to form a lubricating film, and a lubricating film of the diesel engine oil to which molybdenum dithiocarbamate (MoDTC) has been added is formed and exhibited the lubricating performances, whereby the friction coefficient μ is lowered.

Incidentally, low friction performances when the conventionally known molybdenum dithiocarbamate (MoDTC) has been added are clear by comparing Samples No. 1 and No. 3, No. 5 and No. 7 to each other.

Figure 3:
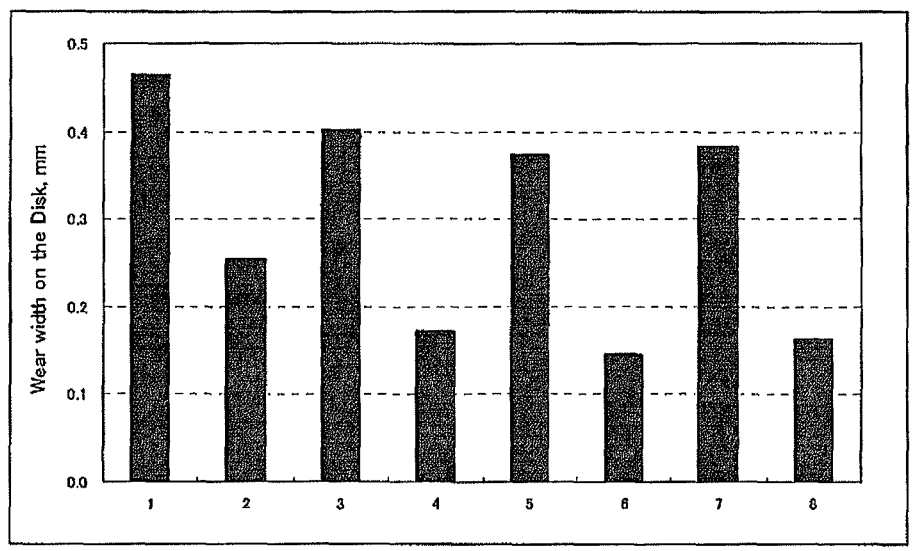
[FIG. 3] This is a figure showing friction coefficients of eight kinds of samples used in Experimental Example 1 comparing to each other.

FIG. 3 shows wear amounts generated at the substrate 10 side, after Experimental Example 1 was carried out, by comparison.

At the vertical axis of FIG. 3, a width (mm) of wear scar generated at the substrate 10 side, and at the horizontal axis, Sample No. is shown. Here, the width (mm) of wear scar generated at the substrate 10 side is proportional to the wear amount.

In FIG. 3, when the samples (No. 2, No. 4, No. 6 and No. 8) in which chromium nitride has been coated are compared with the samples (No. 1, No. 3, No. 5 and No. 7) in which it has not been coated, the wear amounts are clearly lowered.

From FIG. 3, it is clear that the wear resistance is improved when chromium nitride is coated.

EXPERIMENTAL EXAMPLE 2

Figure 4:
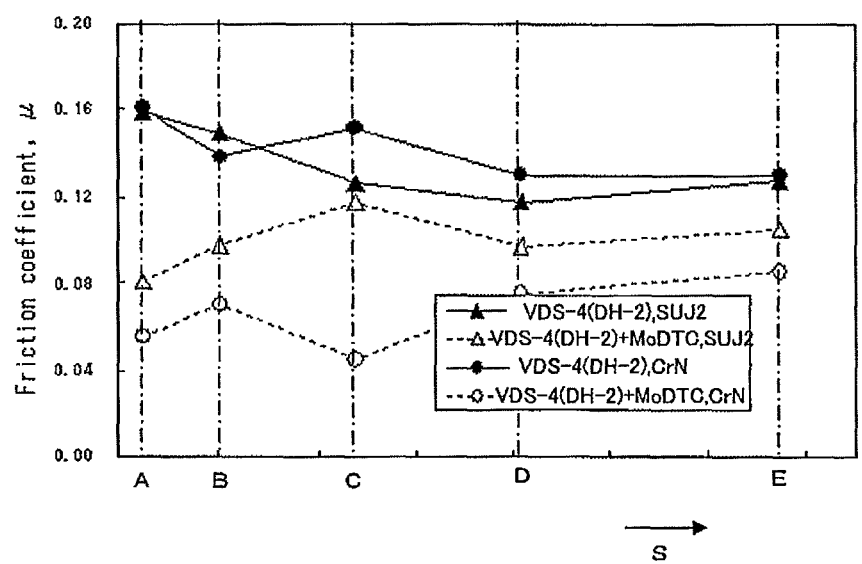
[FIG. 4] This is a figure showing results of Experimental Example 2 and showing a relation-ship between the lubricating conditions and the friction coefficients.

In Experimental Example 2, a lubricant to which no molybdenum dithiocarbamate (MoDTC) is added (relating to FIG. 4, it is shown as "VDS4 (DH-2)" hereinafter) ("DH-2" is a standard of Japanese Automotive Standards Organization) and a lubricant to which molybdenum dithiocarbamate with molybdenum in the amount of 700 ppm has been added (VDS4 (DH-2)+MoDTC) were prepared. The lubricant used with regard to FIG. 4 is a usual diesel engine oil.

A substrate constituted by a high-carbon chromium bearing steel (SUJ2) to which no chromium nitride has been coated and a substrate (CrN) to which chromium nitride has been coated were prepared.

As a result, the following four kinds of samples were prepared.

No. 2-1 (plot "▲" in FIG. 4): Combination of a lubricant {VDS4 (DH-2)} to which no molybdenum dithiocarbamate has been added and a substrate (SUJ2) to which no chromium nitride has been coated.

No. 2-2 (plot "Δ" in FIG. 4): Combination of a lubricant {VDS4 (DH-2)+MoDTC} to which molybdenum dithiocarbamate has been added and a substrate to which no chromium nitride has been coated.

No. 2-3 (plot "●" in FIG. 4): Combination of a lubricant {VDS4 (DH-2)} to which no molybdenum dithiocarbamate has been added and a substrate (TiAlN) to which chromium nitride has been coated.

No. 2-4 (plot "○" in FIG. 4): Combination of a lubricant {VDS4 (DH-2)+MoDTC} to which molybdenum dithiocarbamate has been added and a substrate (TiAlN) to which chromium nitride has been coated.

By changing the lubricating conditions, low friction performances were compared in the same manner as in Experimental Example 1.

The lubricating conditions were determined in the range of a mixed lubrication region using the Sommerfeld number as a standard.

The Sommerfeld number S is a non-dimensional amount like as S=viscosity×speed÷load.

The results of Experimental Example 2 are shown in FIG. 4. In FIG. 4, the vertical axis shows a friction coefficient $\mu$, and the horizontal axis shows the Sommerfeld number S.

In FIG. 4, the term regarding the viscosity in the Sommerfeld number S is converted into "Pa·s", the term regarding the speed into "the frequency ($s^{-1}$)" and the term regarding the load into "the mean Hertzian stress (Pa)", whereby it is obtained.

At the vertical axis of FIG. 4,
the numeral A is the portion where the Sommerfeld number $S=2.12365\times10^{-20}$,
the numeral B is the portion where the Sommerfeld number $S=9.03526\times10^{-20}$,
the numeral C is the portion where the Sommerfeld number $S=2.12365\times10^{-19}$,
the numeral D is the portion where the Sommerfeld number $S=3.6141\times10^{-19}$, and
the numeral E is the portion where the Sommerfeld number $S=5.94509\times10^{-19}$.

Experimental Example 2 was carried out with regard to the lubricating conditions corresponding to the Sommerfeld numbers S shown by the numerals A to E, the lubricating conditions in which the Sommerfeld number S is larger than that of the numeral E and the lubricating conditions in which the Sommerfeld number S is smaller than that of the numeral A.

As mentioned by referring to FIG. 2, when the case (general case) where molybdenum dithiocarbamate is not added to the lubricant, the lubricating performances are lowered when chromium nitride is coated. On the other hand, when molybdenum dithiocarbamate is added to the lubricant, the friction becomes markedly small ($\mu$ is markedly small) and the lubricating performances are remarkably improved when chromium nitride is coated.

In FIG. 4, in the range of the Sommerfeld numbers S shown by A to E, the friction coefficient $\mu$ (plot "○" in FIG. 4) of the sample No. 2-4 is lower than the friction coefficient $\mu$ (plot "▲" in FIG. 4) of the sample No. 2-1, the friction coefficient $\mu$ (plot "Δ" in FIG. 4) of the sample No. 2-2 and the friction coefficient $\mu$ (plot "●" in FIG. 4) of the sample No. 2-3, so that it could be confirmed that the low friction performances in the combination of the lubricant to which molybdenum dithiocarbamate had been added and the chromium nitride coating has been exhibited.

According to the experiment by the inventor, when the Sommerfeld numbers S is smaller than "$2.12365\times10^{-20}$" (in FIG. 4, the left side region than the portion shown by the numeral A), the friction coefficient $\mu$ could not be measured by the experiment device as shown in FIG. 1.

That is, according to the experiment by the inventor, the lubricating conditions in which low friction performances have been confirmed in combination of the lubricant to which molybdenum dithiocarbamate had been added and the chromium nitride coating were only the region in which the Sommerfeld number S was larger than "$2.12365\times10^{-20}$" (the right side region than the numeral A in FIG. 4).

In a case that the Sommerfeld number S was smaller than "$2.12365\times10^{-20}$", it is impossible to measure due to specifications of the experiment device. It can be estimated that if the Sommerfeld number S is smaller than "$2.12365\times10^{-20}$", the properties are belonged in the category of dry friction causing solid contact and that low friction by generating a lubricating film is not able to keep fully, although the Sommerfeld number S of "$2.12365\times10^{-20}$" is not a threshold level.

In FIG. 4, as clearly seen from the comparison of the plot at the numeral C, the plot at the numeral D and the plot at the numeral E, the difference between the plot (○) of the sample No. 2-4 and the plots (▲, Δ and ●) of the samples No. 2-1, 2-2 and 2-3 is small.

According to the experiment carried out by the inventor, in the region of the Sommerfeld numbers S larger than "$5.94509\times10^{-19}$" (the right side region than the numeral E in FIG. 4), the difference between the plot (○) of the sample No. 2-4 and the other plots (▲, Δ and ●) of the samples No. 2-1, 2-2 and 2-3 is smaller.

In other words, according to the experiment carried out by the inventor, the lubricating conditions in which low friction performances have been confirmed in combination of the lubricant to which molybdenum dithiocarbamate had been added and the chromium nitride coating were in the region in which the Sommerfeld number S was smaller than "$5.94509\times10^{-19}$" (the left side region than the numeral E in FIG. 4).

If the Sommerfeld number S is larger than "$5.94509 \times 10^{-19}$", it would be belonging to the category of the so-called "fluid friction", so that it can be estimated that the low friction performances in combination of the lubricant to which molybdenum dithiocarbamate had been added and the chromium nitride coating could not be performed. When it belongs to the category of the fluid friction, a sufficient amount of the lubricant exists between the sliding surfaces but no lubricant film is formed.

From Experimental Example 2, it can be confirmed that the low friction performances in combination of the lubricant to which molybdenum dithiocarbamate had been added and the chromium nitride coating are performed in the range of the Sommerfeld number S of $2.12365 \times 10^{-20} \leq S \leq 5.94509 \times 10^{-19}$.

EXPERIMENTAL EXAMPLE 3

By using the lubricant (VDS4 10W30+MoDTC) to which molybdenum dithiocarbamate had been added and the substrate (CrN) on which chromium nitride had been coated, whether the low friction performances are performed or not was tested in the same conditions as in Experiment Example 1 except for making the Sommerfeld number S "$2.12365 \times 10^{-19}$" and changing the amount of the molybdenum dithiocarbamate (MoDTC) in the range of 500 to 1100 ppm in the molybdenum amount to each 100 ppm.

Experimental results of Experimental Example 3 are shown in the following Table 2.

TABLE 2

| | MoDTC added amount (ppm) | | | | | |
|---|---|---|---|---|---|---|
| | 500 | 600 | 700 | 800 | 900 | 1000 | 1100 |
| Low friction performance | x | Δ | ○ | ○ | ○ | ○ | ○ |

In Table 2, "○" shows that the low friction performances were confirmed as compared with the case where no molybdenum dithiocarbamate had been added. "x" shows that no low friction performance was confirmed.

In Table 2, the low friction performances were shown by "Δ" when the added amount of molybdenum dithiocarbamate (MoDTC) is set to 600 ppm in the molybdenum amount. This means that the low friction performances were performed but they were inferior to the low friction performances in the cases of 700 to 1000 ppm in the molybdenum amount.

It was confirmed by Experiment Example 3 that if the added amount of molybdenum dithiocarbamate is a little, the friction decreasing effect was insufficient and it should be added 600 ppm or more as the molybdenum amount.

In Table 2, the friction coefficient μ in the case where the added amount of molybdenum dithiocarbamate was 1000 ppm in the molybdenum amount and the friction coefficient μ in the case where the added mount was 1100 ppm of the molybdenum amount were not so different from each other. It has been well known that the characteristics of the friction-lowering effect by the lubricant and the added amount of molybdenum dithiocarbamate cannot be obtained in increasing the friction-lowering effect if the added amount of molybdenum dithiocarbamate exceeds a predetermined value, and from Experiment Example 3, it can be confirmed that such a predetermined value is 1000 ppm or so in terms of the molybdenum amount.

In other words, from Experiment Example 3, the friction-lowering effect can be confirmed with the added amount of molybdenum dithiocarbamate of 600 to 1000 ppm in the molybdenum amount.

EXPERIMENTAL EXAMPLE 4

By using the lubricant {VDS4 (DH-2)+MoDTC} to which molybdenum dithiocarbamate had been added and the substrate (CrN) on which chromium nitride had been coated, whether the low friction performances are performed or not was tested in the same conditions as in Experiment Example 1 except for making the Sommerfeld number S "$2.12365 \times 10^{-19}$", for setting an amount of the molybdenum dithiocarbamate (MoDTC) with molybdenum in the amount of 700 ppm and for changing the arithmetic mean roughness of the substrate 10 in the range of 1 to 4 nm to each 0.5 nm.

Experimental results of Experimental Example 4 are shown in the following Table 3.

TABLE 3

| | Arithmetic mean roughness | | | | | | |
|---|---|---|---|---|---|---|---|
| | 1.0 | 1.5 | 2.0 | 2.5 | 3.0 | 3.5 | 4.0 |
| Low friction performance | — | — | ○ | ○ | ○ | ○ | ○ |

In Table 3, "○" shows that the friction coefficient was confirmed to be sufficiently low, and "—" shows that measurement of the friction coefficient could not be carried out.

If the arithmetic mean roughness of the substrate 10 is smaller than 2 nm, it is estimated that a lubricant condition is in the category of fluid friction, and that measurement of the friction coefficient cannot be carried out by the device as shown in FIG. 1 in such the lubricant condition.

In other words, it can be confirmed by Experimental Example 4 that the lubricant does not belong to the category of the boundary friction in which the lubricating film forms between the sliding members, otherwise the arithmetic mean average roughness of the substrate 10 is 2 nm or more.

EXPERIMENTAL EXAMPLE 5

By using the lubricant {VDS4 (DH-2)+MoDTC} to which molybdenum dithiocarbamate had been added and the substrate (CrN) on which chromium nitride had been coated, whether the low friction performances are performed or not was tested in the same conditions as in Experiment Example 1 except for making the Sommerfeld number S "$2.12365 \times 10^{-19}$", for setting an amount of the molybdenum dithiocarbamate (MoDTC) with molybdenum in the amount of 700 ppm, and for changing the arithmetic mean roughness of the substrate 10 in the range of 50 to 70 nm to each 0.5 nm.

Experimental results of Experimental Example 5 are shown in the following Table 4.

TABLE 4

| | Arithmetic mean roughness | | | | |
|---|---|---|---|---|---|
| | 50 | 55 | 60 | 65 | 70 |
| Low friction performance | ○ | ○ | ○ | x | x |

In Table 4, "○" shows that the friction coefficient was confirmed to be sufficiently low, and "×" shows that the friction coefficient was large.

If the arithmetic mean roughness of the substrate 10 is larger than 60 nm, it can be estimated that it could not operate as a sliding member because unevenness of the surface is large.

In other words, it can be confirmed by Experimental Example 5 that the sliding members do not operate in the condition in which the lubricant forms a lubricating film between the sliding members, otherwise the arithmetic mean average roughness of the substrate 10 is 60 nm or less.

The above-mentioned embodiments are merely shown as examples and do not intend to limit the technical scope of the present invention.

For example, in the embodiments shown in the drawings, the ball 20 which is an opposite member of the substrate 10 the sliding surface of which has been coated by chromium nitride is made of a high-carbon chromium bearing steel (SUJ2). However, according to the experiments carried out by the inventor, when the ball 20 is constituted by a ferrous material in which the carbon amount is 0.15 to 0.55% by weight, hardening and tempering treatments has been carried out and carbonizing treatment has been carried out, the same results as in those shown in the drawing, Experimental Example 1 and Experimental Example 2 can be obtained.

Accordingly, the ferrous material in which the carbon amount is 0.15 to 0.55% by weight, hardening, tempering and carbonizing treatments have been carried out may be used in place of the high-carbon chromium bearing steel (SUJ2).

Also in the embodiment, the bearing is exemplified but it is as a matter of course that the present invention can be applied to the other sliding members.

EXPLANATION OF REFERENCE NUMERALS

10 . . . 10
20 . . . 20
P . . . Load
F . . . Direction to which the friction acts

The invention claimed is:

1. A sliding mechanism, comprising:
a plurality of sliding members made of a steel material,
wherein at least one sliding surface of at least one sliding member of the plurality of sliding members is coated by chromium nitride,
wherein a diesel engine oil to which molybdenum dithiocarbamate has been added with molybdenum in an amount of at least 600 ppm and at most 1000 ppm is interposed between the plurality of sliding members as a lubricant,
wherein an arithmetic mean roughness of each sliding member of the plurality of sliding members is at least 2 nm and at most 60 nm, and
wherein lubricating conditions are such that a Sommerfeld number is at least $2.12365 \times 10^{-20}$ and at most $5.94509 \times 10^{-19}$, upon converting a viscosity thereof to Pa·s, a speed to $s^{-1}$, and load to mean Hertzian stress (Pa).

2. A method for reducing friction of a sliding mechanism, comprising the steps of:
coating chromium nitride on at least one sliding surface of at least one sliding member of a plurality of sliding members made of a steel material;
adding molybdenum dithiocarbamate with molybdenum in an amount of at least 600 ppm and at most 1000 ppm to a diesel engine oil,
interposing the diesel engine oil between the plurality of sliding members as a lubricant;
setting the arithmetic mean roughness of each of the sliding members of the plurality of sliding members to at least 2 nm and at most 60 nm; and
setting lubricating conditions such that a Sommerfeld number is at least $2.12365 \times 10^{-20}$ and at most $5.94509 \times 10^{-19}$, upon converting a viscosity thereof to Pa·s$^{-1}$, and a load to mean Hertzian stress (Pa).

* * * * *